Sept. 29, 1959
G. P. HUNGERFORD ET AL
2,906,660
GLASS FIBER DISPERSIONS, SHEETS, PLASTIC
IMPREGNATED SHEETS AND
METHODS OF FORMING
Filed April 17, 1956

INVENTORS
GORDON P. HUNGERFORD
JOSEPH C. YARZE
ATTORNEY

United States Patent Office 2,906,660
Patented Sept. 29, 1959

2,906,660

GLASS FIBER DISPERSIONS, SHEETS, PLASTIC IMPREGNATED SHEETS AND METHODS OF FORMING

Gordon P. Hungerford, Westport, Conn., and Joseph C. Yarze, Jersey City, N.J., assignors to American Machine & Foundry Company, a corporation of New Jersey Application April 17, 1956, Serial No. 578,707

15 Claims. (Cl. 162—102)

This application is a continuation in part of copending application, Serial Number 293,092, filed June 12, 1952.

This invention relates to mineral fiber dispersions, to thin, uniform sheets of mineral fiber, and mineral fiber reinforced plastic sheets and films, and to methods of forming such sheets, films and dispersions.

Heretofore, attempts to produce very thin, uniform sheets of mineral fibers have failed because of the apparent impossibility of avoiding fiber flocculation. It has been possible to produce only relatively thick, non-uniform mineral fiber sheets, unsuitable for many industrial needs, for example, for use in insulation, and for related uses in electrical and electronic fields.

However, mineral fiber sheets have previously been made and indeed have been impregnated with plastic and used as electrical insulation. For example, the manufacture of glass fiber paper impregnated with plastic resins is described in a publication of the Naval Research Laboratory, Washington, D.C., May 1951, "The Electrical Properties of Glass-Fiber Paper," by Callinan, Lucas and Bowers. The paper described in this publication was no thinner than about five mils. The sheet was manufactured by usual paper making methods and was of uneven texture, opaque and had a fluffy surface similar to blotting paper. Moreover, fibers were conspicuously clumped and flocculated throughout the paper. Flocculation and clumping of fibers reduce the electrical insulating value of glass fiber sheets.

It is therefore an object of the invention to provide very thin, uniform mineral or mineral derivative inorganic fiber sheets free from fiber flocculation.

Another object of the invention is to provide a method of manufacturing thin mineral fiber sheets and thin plastic sheets containing mineral fibers.

Objects and advantages of the invention are further set forth in the following specification when read in connection with the accompanying drawings which illustrate the embodiments thereof in which:

Figure 1 illustrates diagrammatically and schematically suitable apparatus for producing mineral fiber sheets; and Figure 2 illustrates diagrammatically and schematically suitable apparatus for use in conjunction with the apparatus of Figure 1 for producing mineral fiber reinforced plastic sheets and films; and Figure 3 illustrates diagrammatically and schematically a modified type of apparatus for producing sheets and films somewhat similar to those produced with the apparatus shown in Figure 2.

The present invention solves the problem of forming uniform mineral fiber sheets and high quality mineral fiber reinforced plastic sheets and films which may range from smooth ultra thin sheets and film, thinner than tissue paper and of a translucent quality, to relatively thick opaque sheets and films, according to the requirements of products in which the use of these sheets and films would be desirable and valuable. In general these sheets are between 0.1 and 10.0 mils in thickness. The sheets thinner than 5.0 mils and particularly those thinner than 1.0 mil exhibit striking novelty.

While the term glass fibers has been used and occurs hereinafter, it will be understood that it is used broadly since other fibers of a mineral or a mineral derivative inorganic nature, such as quartz glass, mineral wool and the like, may also be used with satisfactory results in the practice of this invention depending on the requirements to be met in the finished product. This invention, however, does not contemplate the use of chrysotile asbestos fiber.

MINERAL FIBER DISPERSIONS

Referring to the drawings, Figure 1 shows diagrammatically and schematically, apparatus for and a preferred method of carrying out the invention. A source of supply of a suitable dispersant 2, for example a cellulose ether, is connected with a water supply 4 at a first mixing tank 6 where the dispersant and water are mixed together by a mixer 8 to form a viscous dispersion or solution.

Dispersing media which can be used satisfactorily for dispersing the fibers therein include aqueous preparations of polysaccharide materials and in particular carboxymethyl cellulose and its soluble salts, carboxymethyl hydroxyethyl cellulose and its soluble salts and hydroxyethyl cellulose; aqueous algin preparations such as sodium alginate; both aqueous polyhydric alcohols and substantially non-aqueous polyhydric alcohols such as glycerine, polyethylene glycol and polypropylene glycol and similar materials. Dispersants may be used alone or in suitable mixtures. For best results, the dispersant delivered from the first mixing tank 6 to the filter 10 should have a viscosity below 2500 centipoises at 30° C.

The mixture in the first mixer 6 is filtered by a suitable conventional filter 10 and delivered into a second mixing tank 12, similar in construction and design to the first mixing tank 6. Glass fiber is delivered by a suitable feed 14 into the second mixing tank 12. The fiber is dispersed by the combined action of the dispersing medium and a high speed cutting blade 16, having an action similar to the blades of a "Waring Blendor" or a "Cowles" dissolver.

The dispersion may then be diluted in the tank 20 by adding water before use. Depending upon the dispersing agent employed the suspension may be as thick at 1200 grams of fiber in 32 gallons of water. When using a glycerine medium, for example, a dispersion of about 1500 grams of fiber in 1400 gallons of water is satisfactory. Generally the fibers are less than 1% by weight of the dispersion. However, the more dilute the dispersion the more uniform the final sheet will be.

Glass fibers suitable for sheet manufacture range in size from about 0.1 micron to about 10 microns in diameter. The thinner sheets generally require the use of smaller diameter fibers and in sheets less than five mils thick the fibers are preponderantly less than four microns in diameter. A very uniform sheet is made by using a mixture of fibers of about 0.7 micron average diameter wherein more than 90% of the fibers are between 0.1 and 2.5 microns in diameter. In general, most of the fibers are about one quarter inch long when put into the dispersing machinery. The length may range from about one hundredth of an inch to about three quarters of an inch and in the finished sheet most of the fibers are between 0.1 and 10 millimeters long.

In the suspension, the glass fibers are so evenly dispersed that they are all substantially perfectly and uniformly distributed in the final sheet, film or web formed therefrom. The dispersion is free from parallel clumps and bundles of fibers, although, of course, some fibers do touch one another at various angles. However, the interfiber contact is reduced by dilution. This results in a final product which is infinitely more uniform than any material formed from glass fibers heretofore known. The preparation of a floc free fiber dispersion is a novel feature of the invention which it is believed may be largely responsible for the floc free finished sheet obtained.

*Example 1*

An 0.7 weight percent aqueous sodium carboxymethyl cellulose (high viscosity) solution was filtered through glass wool. To 100 parts of filtered sodium carboxymethyl cellulose solution 0.5 part of AAA glass fiber (i.e. 0.75 micron average diameter) were added. This mixture was agitated in a mixer having a blade action similar to the cutting and mixing blades of a "Waring Blendor," to effect dispersion of the glass fibers in the cellulose ether solution.

*Example 2*

One part of hydroxyethyl cellulose solution (Carbide and Carbon Company, grade WSLH) was mixed with two parts of water to yield a solution with a viscosity of about 800 centipoises at 20° C. as measured on a "Brookfield" viscometer. To 1000 parts of this solution was added 0.5 part of grade AAA glass fiber (Owens-Corning Fiberglas Corporation) and the mixture was agitated in a "Waring Blendor" for 20 minutes to effect complete dispersion of the glass fibers in the hydroxyethyl cellulose solution.

MINERAL FIBER SHEETS

From the tank 20, the dispersion is forced by a suitable pump (not shown) through a conduit 22 to a sheet or web forming machine 24. This machine includes a sump 26 into which the fiber dispersion is pumped by a suitable mechanism (not shown) from tank 20.

The use of underscreen suction is also a feature of this invention although conventional gravity drainage alone is within the scope of the invention. As shown in Figure 1, a drum 28 is mounted on a shaft 29, and is provided with a frame 32 formed of a plurality of radial vanes 34 which with the screen 30 form a plurality of generally V-shaped chambers 36. As the drum 28 rotates and moves the screen 30 into and out of a sump 26, suction is created successively in the chambers 36. The screen 30 is arranged so that when suction is applied within the drum and under the screen, the fluid dispersing medium is sucked through the screen, leaving a continuous web of mineral fibers W uniformly applied to the surface of the screen and the dispersant is removed by a suction conduit 40 connected to an end piece or bearing 31, provided with an opening. A conduit 40 is connected successively to the chambers 34 and to a recycling storage tank 42 for delivery of recovered fluid by a recycling pump 44 through a conduit 46 back to the second mixing tank 12. Suction for the tank 42 is created by a suitable pump (not shown) attached to a conduit 43 in the tank 42. Thicker or thinner fiber sheets are made by increasing or decreasing the quantity of fiber applied to the screen.

Excellent results are to be obtained using screens ranging in fineness between 80 and 200 mesh per linear inch. A preferred size screen which gives a smooth surface sheet with AAA glass fiber, i.e. 0.75 micron average diameter) is about 170 mesh. Generally, finer fibers are handled on finer screens for best results. Screens smaller than about 120 mesh have been heretofore unknown in commercial paper making techniques and the use of screens between 120 and 200 mesh for the manufacture of unwoven sheet material from fibers is a novel feature of this invention.

Further continued clockwise rotation of the drum 28, as viewed in Figure 1, positions each web coated portion of the screen 30 and the respective chambers 34 successively beneath a wash water nozzle 38 which applies water upon the exterior surface of the screen 30. The wash water removes from the glass fiber web on the screen 30 substantially all of the dispersant not removed previously by suction or drainage and helps to avoid cementing the fibers to the screen. The section on which the wash water is applied is also under suction. This is to prevent the web from being disrupted by the washing means. Water is removed from the chambers 34 as the latter move successively past the opening (not shown) in the end piece 31 connected by a suction conduit 48 through which wash water and residual dispersant are discharged into a tank 50. Suction for the tank 50 is created by a suitable pump (not shown) attached to a conduit 45 in the tank 50. This operation leaves the glass fibers in web form on the surface of the screen 30. However, the washing operation is an optional feature of the invention and may be omitted when the desired properties of the final sheet are achieved without it, and when the binder does not cement the fibers to the screen.

Webs less than one mil in thickness which have been completely dried on the screen 30 can be removed successfully from the screen and handled without the use of binder material. Complete drying on the screen or wire is entirely contrary to commercial paper making methods and is a novel feature of this invention.

When undried sheets are removed from the screen 30, thicknes as low as about 0.5 mil is handled successfully. By using a small amount of adhesive binder between about 1% and 12% by weight of the web, such as sodium carboxymethyl cellulose, urea formaldehyde resin, hydroxyethyl cellulose, alumina sol, colloidal silica or similar binders, and then drying on the screen, webs in the vicinity of 0.1 mil can be removed from the screen and handled satisfactorily. A continuous screen belt can also be used to form webs and sheets. The tensile strength of the glass fiber sheets can be adjusted somewhat according to the quantity of binder applied. The breaking strength of the finished sheet varies from about 150 to 1500 grams per inch of width depending on thickness, fiber size and binder used. Wet strength is about two-third the dry tensile strength which ranges from about 95 to 950 p.s.i.

A suitable binder material, for example a polysaccharide, may be applied, as by a nozzle or spray mechanism 52, upon the fiber web on the screen 30 while or after suction is applied to the underside of the screen 30. As the drum 28 rotates, the fiber web therein is passed through a drying zone 54 and moisture is removed. Binder may also be applied to the web W while still on the screen just prior to removal from the screen and after the drying operation. The binder adds wet strength so that the sheet can be impregnated with plastic by dipping. The application of a binder may also be omitted without departing from the scope of the invention.

It is interesting to note that sheets and webs thus made are not pressed or calendered but are inherently smooth and thin. Indeed calendering glass fiber sheet would fracture the fibers and destroy many valuable properties of the sheet.

Low pressure air may be used to facilitate the removal of the web or sheet W from the screen 30. This, as shown in Figure 1, consists of an air conduit 56 connected to the end piece 31 which is provided with an opening such that when each chamber 34 moves past, air from the conduit 56 blows against the underside of the web or film W on the screen 30 and loosens or detaches it for ready removal. The sheet material is conveniently wound from the forming apparatus into reels. If desired the web can be cut into sheets or tapes.

Mineral fiber sheet material, manufactured according to this invention, is extremely thin and porous. Sheets range in weight between about 0.1 gram per square foot and about 12.0 grams per square foot. The heavier sheets contain about 10% binder material on a weight basis per unit area. The very thin smooth floc free sheets are between about 0.1 and 1.5 mils in thickness. Because the thickness of a resilient mat is difficult to measure, weight per unit area is a preferred index of thickness. The sheet has a translucent quality in single thickness and appears white when rolled in many layers. Single sheets examined with the naked eye, show no white clumps or flocs which would be visible if the fibers were not homogeneously dispersed throughout the sheet. The presence of flocs, such as in blotting paper, is a warning of uneven electrical insulating properties, partciularly in sheets which are subsequently to be impregnated or coated with plastic resin.

*Example 3*

Dispersion prepared as in Example 1 was applied to a 200 mesh screen so that about 325 cc. of dispersion covered 100 square inches of a screen. Thickness of the final sheet was controlled by the rate of dispersion flow onto the screen which was in turn a function of the screen speed as well as the rate at which dispersion was pumped from the head box.

The dispersant was then drawn through the screen by suction on the underside of the screen which left a mat of glass fibers in web or sheet form on the screen.

The deposited glass fiber mat was next washed with water, while still applying suction to the underside of the screen to remove any retained dispersant, and a binder solution of 0.05 weight percent sodium carboxymethyl cellulose solution in water was applied to the fiber sheet. The sodium carboxymethyl cellulose present in the retained binder solution gave considerable strength to the final sheet which was dried and removed from the screen. The finished glass fiber sheet or web produced in this manner was about 0.3 mil thick and had a tensile strength of 200–300 grams per inch of width.

*Example 4*

The dispersion was applied to a 200 mesh screen (approximately 325 cc. of dispersion per 100 square inches of screen area). The dispersant was sucked through the screen. The deposited glass fiber mat was washed with water while applying suction to the underside of the screen to remove any retained dispersant, and a binder solution, composed of two parts hydroxyethyl cellulose solution (Carbide and Carbon Company grade WSLH) and 150 parts of water, was applied to the fiber sheet. The hydroxyethyl cellulose present in the retained binder solution gave considerable strength to the finished fiber sheet or web which was dried and removed from the screen. The finished dried sheet or web produced in this manner was about 0.4 mil thick.

*Example 5*

This was substantially the same as the combination of Example 1 and Example 2, except that instead of using sodium carboxymethyl cellulose in water solution as the dispersant, glycerine alone was used. Glycerine glass fiber dispersion was then treated in the same manner as in Example 1.

MINERAL FIBER REINFORCED PLASTIC SHEETS

Reinforced plastic sheets and films produced in accordance with this invention are extremely uniform and have more "body" than unreinforced films heretofore known or available. They feel thicker and stretch less easily. In addition, these sheets and films have higher yield strength than unreinforced films and sheets.

Certain plastic materials, and particularly polyfluoroethylenes such as polytetrafluoroethylene, known and sold under the registered trademark "Teflon," which heretofore could not be formed into satisfactory thin films or sheets by any practical film forming process, can now be converted by this invention into ultra thin, strong, extremely uniform sheets and films with excellent dielectric strength by impregnating ultra thin mineral fiber sheets and webs with plastic material. Trifluoromonochloroethylene polymers and copolymers may also be used. Other plastics which may be formed into sheets and reinforced according to this invention include: silicones, polyvinyl acetate-methylal resins, polystyrene and vinyls such as polyvinyl chloride and related copolymers.

Ultra thin glass fiber, unwoven, paper-like webs in the vicinity of 0.3 mil thick, are porous structures having up to 95% or more void space. In this sense they are somewhat like blotting paper, except that blotting paper cannot be made thin by heretofore available processes and has a fuzzy uneven surface and many fiber clumps and flocs. Because ultra thin glass fiber sheets in the vicinity of 0.3 mil, made in accordance with the invention, have a high percentage of voids, they can be readily and completely impregnated and so made free from voids. Indeed, it is because these sheets have such a high percentage of voids, that complete impregnation is so easily accomplished. A film of fiber free plastic covers each surface of the finished sheet in addition to filling and sealing void spaces.

Referring to Figure 2, in the formation of plastic impregnated glass fiber sheets, films and webs, the product made in accordance with the method of Figure 1 (i.e. unwoven sheet) is led over a rotating drum 60 mounted on a shaft 61, preferably continuously driven. The web W is held upon the surface of the drum 60 by a holddown roller 62, and a spray of "Teflon" suspensoid, for example, or other suitable plastic water insoluble impregnant is applied by a suitable means such as a spray 64, to the glass fiber sheet or web W.

The plastic impregnated glass fiber web is moved by the drum 60 through a drying and/or fusing zone 66 which may consist of a conventional type of electrical heater or other suitable heater. This operation dries and fuses the "Teflon" or other plastic, and wholly burns out the binder to form an extremely uniform, strong, partially impregnated thin glass fiber web W2 which will resist the solubilizing action of subsequent impregnating liquid.

The heat treated partially plastic impregnated glass fiber web W2 is then further impregnated with plastic suspensoid. This may be effected by running the web or film W2 through a dip tank 68 beneath a driven roller 70 located therein. After the dipping operation, the impregnated web is moved through a drying zone 72 which may consist of conventional electrical resistance type heating elements 74 and 76 spaced as shown in Figure 2. The dried sheet is next carried over a driven roller 78 and moved by a driven tension roller couple 80 through a fusion zone 82 to fuse the "Teflon" or other plastic and complete the plastic film. The finished film or sheet can be rolled up or cut to size if desired.

Mineral fiber dielectric sheets partially impregnated with plastic, such as "Teflon," so as to be semi-porous weigh between 160 milligrams and 10 grams per square foot, depending upon the thinness of the fiber sheet and amount of plastic used. Completely impregnated nonporous mineral reinforced polytetrafluoroethylene films weigh between about 3.5 and 12 grams per square foot. Tensile strength ranges between 100 and 5,000 grams per inch of width depending on fiber size and thickness and upon the amount of plastic per unit area.

*Example 6*

The dried glass fiber sheets or webs produced in accordance with Examples 3, 4 and 5 were sprayed with a minimum quantity of (25–35%) "Teflon" dispersion in water containing less than 1% by weight of a wetting agent such as an alkylaryl alkali sulfonate. The sprayed sheet was treated for ten minutes at a temperature between 325°–400° C. to fuse the "Teflon" and burn out any retained cellulose ether binder. The partially impregnated sheet was dipped in concentrated (50–60% solids) "Teflon" dispersion, dried and fused for five minutes at about 400° C. Additional applications of "Teflon" can be used if thicker finished sheets or webs are desired.

Example 7

The dried glass fiber sheets or webs, produced in accordance with Examples 3, 4 and 5 were dipped in a solution (10% solids) of polyvinyl acetate-methylal resin, Shawinigan Chemical Company electrical grade 15/95 "E" "Formvar" and the excess solution was drained from the sheet. The impregnated sheet was air dried. The reinforced plastic sheet was 0.8 mil thick. Thicker or thinner sheets can be prepared as desired by using a more or less concentrated impregnating solution.

Thus, there are produced very thin, plastic sheets and films capable of many satisfactory uses, as for example, packaging material, or insulation materials in capacitors, transformers, motors and cables, and which can be used in many other products where the particular characteristics of these plastic materials such as strength, resistance to temperature, dielectric strength, etc. are important and desirable factors.

There has been described a novel, thin, smooth mineral fiber sheet material and a method of forming it including a floc free mineral fiber dispersion. There have also been described plastic films reinforced by mineral fibers and methods of forming them.

What is claimed is:

1. A suspension in a liquid of individually dispersed glass fibers comprising less than 1% by weight glass fibers, at least 90% of which are between 0.1 and 2.5 microns in diameter, and at least one dispersing agent selected from the group consisting of polyhydric alcohols, cellulose ethers and algin compounds.

2. A glycerine suspension of glass fibers according to claim 1.

3. An aqueous cellulose ether suspension of glass fibers according to claim 1.

4. A method of forming a substantially uniform dispersion of glass fibers comprising the steps of preparing an aqueous dispersing medium with a viscosity below 2500 centipoises at 30° C. selected from at least one of the group consisting of polyhydric alcohols, cellulose ethers and algin compounds, filtering said dispersing medium, adding glass fibers, at least 90% of which are between 0.1 and 3.8 microns diameter, to said filtered dispersing medium in a concentration between 1.5 and 100 grams per 100 pounds of dispersing medium and agitating said fibers in said dispersing medium with a high speed blade until said fibers are substantially, individually and uniformly dispersed.

5. A method of forming a substantially uniform dispersion of glass fibers comprising the steps of preparing a glycerine dispersing medium with a viscosity below 2500 centipoises at 30° C., filtering said dispersing medium, adding glass fibers, at least 90% of which are between 0.1 and 3.8 microns diameter, to said filtered dispersing medium in a concentration between 7.5 and 100 grams per 100 pounds of dispersing medium and agitating said fibers in said dispersing medium with a high speed blade until said fibers are substantially, individually and uniformly dispersed.

6. A method of forming a substantially uniform dispersion of glass fibers comprising the steps of preparing an aqueous cellulose ether dispersing medium with a viscosity below 2500 centipoises at 30° C., filtering said dispersing medium, adding glass fibers, at least 90% of which are between 0.1 and 3.8 microns diameter, to said filtered dispersing medium in a concentration between 7.5 and 100 grams per 100 pounds of dispersing medium and agitating said fibers in said dispersing medium until said fibers are substantially, individually and uniformly dispersed.

7. A self-supporting glass fiber paper weighing between 0.1 and 9.0 grams per square foot and consisting of glass fibers, uniformly distributed throughout said paper as individual and distinct non-flocculated fibers having diameters less than ten microns.

8. A glass fiber paper according to claim 7 impregnated with polytetrafluoroethylene.

9. A glass fiber paper according to claim 7 impregnated with a silicone resin.

10. A glass fiber paper according to claim 7 impregnated with polystyrene.

11. A glass fiber paper according to claim 7 impregnated with polyvinyl chloride.

12. A glass fiber paper according to claim 7 impregnated with polyvinyl acetate-methylal resin.

13. A glass fiber paper according to claim 7 impregnated with trifluoromonochloroethylene.

14. A self-supporting glass fiber paper weighing between 0.2 and 12 grams per square foot and consisting of glass fiber, uniformly distributed throughout said paper as individual and distinct non-flocculated fibers having diameters less than ten microns and containing between 1% and 12% by weight of an adhesive binder.

15. Glass fiber paper according to claim 14 wherein at least 90% of the fibers are between 0.1 and 2.5 microns diameter.

References Cited in the file of this patent

UNITED STATES PATENTS

| | | |
|---|---|---|
| 2,592,554 | Frankenberg | Apr. 15, 1952 |
| 2,658,848 | Labino | Nov. 10, 1953 |
| 2,706,156 | Arledter | Apr. 12, 1955 |
| 2,728,699 | Labino | Dec. 27, 1955 |
| 2,787,542 | Labino | Apr. 2, 1957 |

OTHER REFERENCES

Callinan et al.: "The Electrical Properties of Glass Fiber Paper," May 1951.